United States Patent
Gordon

(10) Patent No.: US 6,875,364 B2
(45) Date of Patent: Apr. 5, 2005

(54) SELF-CLEANING FLUID FILTER SYSTEM

(75) Inventor: Robert R. Gordon, Santa Fe, NM (US)

(73) Assignee: Gordon Construction, Inc., Espanola, NM (US)

( * ) Notice: Subject to any disclaimer, the term of this patent is extended or adjusted under 35 U.S.C. 154(b) by 80 days.

(21) Appl. No.: 10/277,225

(22) Filed: Oct. 18, 2002

(65) Prior Publication Data

US 2003/0155314 A1 Aug. 21, 2003

Related U.S. Application Data

(63) Continuation of application No. 10/082,626, filed on Feb. 21, 2002, now Pat. No. 6,758,344.

(51) Int. Cl.⁷ .............................................. B01D 37/00
(52) U.S. Cl. .................. 210/791; 210/107; 210/321.69; 210/411; 210/416.1; 210/448; 210/798; 55/301
(58) Field of Search ................................ 210/107, 108, 210/170, 258, 333.01, 333.1, 332, 411, 416.1, 448, 452, 458, 747, 321.69, 791, 797, 798; 55/284–288, 301

(56) References Cited

U.S. PATENT DOCUMENTS

| | | |
|---|---|---|
| 1,196,560 A | 9/1916 | Leisse |
| 1,359,162 A | 11/1920 | Genter |
| 1,591,229 A | 7/1926 | Oliver et al. |
| 1,750,935 A | 3/1930 | Maunula et al. |
| 2,046,770 A | 7/1936 | Coberly et al. |
| 2,279,838 A | 4/1942 | Oliver |
| 2,322,586 A | 6/1943 | Oliver |
| 2,772,786 A | 12/1956 | Gardes |
| 2,954,873 A | 10/1960 | Davis |
| 3,176,846 A | 4/1965 | Adams |
| 3,193,103 A | 7/1965 | Snyder |
| 3,228,528 A | 1/1966 | Mummert et al. |
| 3,288,294 A | * 11/1966 | Frey ........................... 210/134 |
| 3,380,591 A | 4/1968 | Muller |
| 3,574,509 A | 4/1971 | Zenlis et al. |
| 3,647,071 A | 3/1972 | Lamort |
| 3,992,301 A | 11/1976 | Shippey et al. |
| 4,037,661 A | 7/1977 | Ford ........................... 166/311 |
| 4,059,518 A | 11/1977 | Rishel |
| 4,169,792 A | 10/1979 | Dovel |
| 4,210,538 A | 7/1980 | Tantillo et al. |
| 4,210,539 A | * 7/1980 | Shiban ........................ 210/391 |
| 4,244,821 A | * 1/1981 | Molvar ........................ 210/220 |
| 4,297,209 A | 10/1981 | DeVisser et al. |
| 4,462,916 A | 7/1984 | Ecabert et al. |
| 4,504,288 A | 3/1985 | Kreft |
| 4,518,501 A | 5/1985 | Lennartz et al. |
| 4,636,311 A | 1/1987 | Litzenburger |
| 4,642,188 A | 2/1987 | DeVisser et al. |
| 4,655,910 A | 4/1987 | Tabor |

(Continued)

FOREIGN PATENT DOCUMENTS

GB 2354185 3/2001

Primary Examiner—Joseph Drodge
(74) Attorney, Agent, or Firm—Knobbe, Martens, Olson & Bear, LLP

(57) ABSTRACT

A self-cleaning, back-washable filter apparatus and method for use with a pumping apparatus which is lowered into a well casing. The filter apparatus includes a filter basket having a manifold with several tubes extending therefrom. A filter sock encases at least a portion of the filter basket to block sand or other solid particles from entry into the pump intake. Pressurized gas or fluid is directed to the manifold and then through perforations or jets distributed along the length of the tubes. Bursts of the pressurized gas are directed from the perforations or jets to the interior of the filter apparatus and then sprayed from the perforations or jets in an outwardly direction against interior surfaces of the filter sock. Air or fluid bursts from the perforations impinge upon the interior surfaces of the filter sock and dislodge or expel entrapped particulate material.

73 Claims, 9 Drawing Sheets

U.S. PATENT DOCUMENTS

| | | |
|---|---|---|
| 4,655,911 A | 4/1987 | Tabor |
| 4,781,825 A | 11/1988 | Grimes et al. |
| 4,818,420 A | 4/1989 | Mims |
| 4,977,958 A | 12/1990 | Miller |
| 5,246,580 A | 9/1993 | Stedfeldt |
| 5,354,466 A | 10/1994 | Yunoki |
| 5,370,791 A | 12/1994 | Lescovich et al. |
| 5,401,396 A | 3/1995 | Lescovich et al. |
| 5,490,924 A | 2/1996 | Macia et al. ............. 210/257 |
| 5,575,911 A | 11/1996 | Rosenberg |
| 5,690,824 A | 11/1997 | Stuth .................. 210/333.01 |
| 5,910,249 A | 6/1999 | Kopp et al. ............... 210/617 |
| 6,120,688 A | 9/2000 | Daly et al. |
| 6,139,727 A | 10/2000 | Lockwood |
| 6,155,430 A | 12/2000 | Goodman |
| 6,197,192 B1 | 3/2001 | Smith-Haddon et al. |
| 6,231,764 B1 | 5/2001 | Wilkins ................... 210/297 |
| 6,270,671 B1 | 8/2001 | Shorr et al. |
| 6,283,305 B1 | 9/2001 | Maeda et al. ............. 210/356 |

* cited by examiner

US 6,875,364 B2

SELF-CLEANING FLUID FILTER SYSTEM

CROSS REFERENCE TO RELATED APPLICATIONS

This application is a continuation of U.S. patent application Ser. No. 10/082,626 entitled "SELF-CLEANING FLUID FILTER SYSTEM" filed on Feb. 21, 2002 now U.S. Pat. No. 6,758,344. The disclosure of the above-described reference is hereby incorporated by reference in its entirety.

BACKGROUND OF THE INVENTION

1. Field of the Invention

The invention relates to a filter apparatus and more particularly to a self-cleaning, back-flushable filter for removing particulate material from a pump intake.

2. Description of the Related Art

Submersible pumps are often lowered into fluid supplies such as those found in well casings or ponds in order to remove the fluid that is found there. Often, the fluid contains sand and other abrasive particles that are a constant cause of inefficiency in and potential failure of the pumping systems. For example, sand can cause severe damage to the pump and valves in the pumping system.

Many types of filters have been designed for use with submersible pumps. Such filters have typically included a filter element designed to screen particulate material from the pump intake. However, the particulate material often becomes entrapped in the filter element. The quantity of particulate material collected on the filter element is directly proportional to the to the pressure drop that occurs across the filter element. Since an excessive pressure drop across the filter element can significantly reduce fluid flow, the filter element must be periodically changed or cleaned. Often, this is done by removing the submersible pump from the fluid and removing the filter element. This can be a timely and inconvenient process. Pumps with intricate backwashing systems have been designed, but these are often expensive and cannot be used to retrofit existing systems. As a result, many pumps are generally operated without any filter and therefore experience early pump failure and extensive and costly down time.

There exists, therefore, a continuing need for further improvements in fluid filter devices having a self-cleaning filter element. There further exists the need to have a relatively simple and reliable manner of backwashing filter elements used with an existing pump.

SUMMARY OF THE INVENTION

In one embodiment, the invention is a filter apparatus for use with a submersible pump. The filter apparatus includes a filter element, a supply line for delivery of a flushing medium, and a filter basket, wherein the filter element extends about at least a portion of the filter basket. The filter basket includes a manifold including a flushing medium supply opening in a first surface thereof for receiving said supply line, a plurality of apertures in a second surface of said manifold, an internal chamber fluidly connecting said flushing medium supply opening with said plurality of apertures, and a blocking piece positioned in said internal chamber and configured to move rotatably in said internal chamber and periodically block a flow of flushing fluid from the flushing medium supply opening to the plurality of apertures. The filter basket also includes a plurality of tubes, wherein each tube of the plurality of tubes extends from one of the plurality of apertures and includes a plurality of perforations such that a flushing medium may flow from the supply line through the internal chamber into the plurality of tubes and through the perforations to backflush the filter element. The filter apparatus can further include a submersible pump with an electric motor located within the filter basket.

Another embodiment of the invention is a system for cleaning a filter apparatus used for screening the intake of a pump. The system includes a supply tank for storing a pressurized flushing medium, a supply line for delivery of the flushing medium, and a filter apparatus. The filter apparatus includes a filter element, a supply line for delivery of a flushing medium, and a filter basket, wherein the filter element extends about at least a portion of the filter basket. The filter basket includes a manifold including a flushing medium supply opening in a first surface thereof for receiving said supply line, a plate with a slot chamber formed therein fluidly connecting the flushing medium supply opening with a plurality of apertures, and a blocking piece positioned within the slot chamber configured to periodically block a flow of fluid from the flushing medium supply opening and the plurality of apertures. The filter basket also includes a plurality of tubes, wherein each tube of the plurality of tubes extends from one of the plurality of apertures and includes a plurality of perforations such that a flushing medium may flow from the supply line through the internal chamber into the plurality of tubes and through the perforations to backflush the filter element. The filter apparatus can further include a submersible pump with an electrical motor within the filter basket.

Another embodiment of the invention is a method of flushing a filter apparatus used to screen the intake of a pump. The method encasing a pump with a pump suction inlet in a filter basket comprising a plurality of tubes, wherein each tube has at least one perforation therein, surrounding at least a portion of the filter basket with a filter element such that a fluid to be pumped passes through the filter element to reach the pump suction inlet, directing a flushing medium to a chamber in fluid connection with the perforations in the tubes such that the flushing fluid is sprayed in an outwardly direction against interior surfaces of the filter element to dislodge or expel entrapped particulate material during operation of the pump. The method further includes periodically blocking the flow of the flushing medium to the tubes with a blocking piece configured to rotate around the chamber such that the blocking piece successively blocks the flow of the flushing fluid to the various tubes by passing over one or more apertures connecting the chamber with the tubes.

BRIEF DESCRIPTION OF THE DRAWINGS

These and other objects and features of the invention will become more fully apparent from the following description and appended claims taken in conjunction with the following drawings, wherein like reference numerals indicate identical or functionally similar elements.

DETAILED DESCRIPTION OF THE INVENTION

Embodiments of the invention will now be described with reference to the accompanying Figures, wherein like numerals refer to like elements throughout. The terminology used in the description presented herein is intended to be interpreted in its broadest reasonable manner in accordance with its ordinary use in the art and in accordance with any overt definitions provided below.

Figure 1:
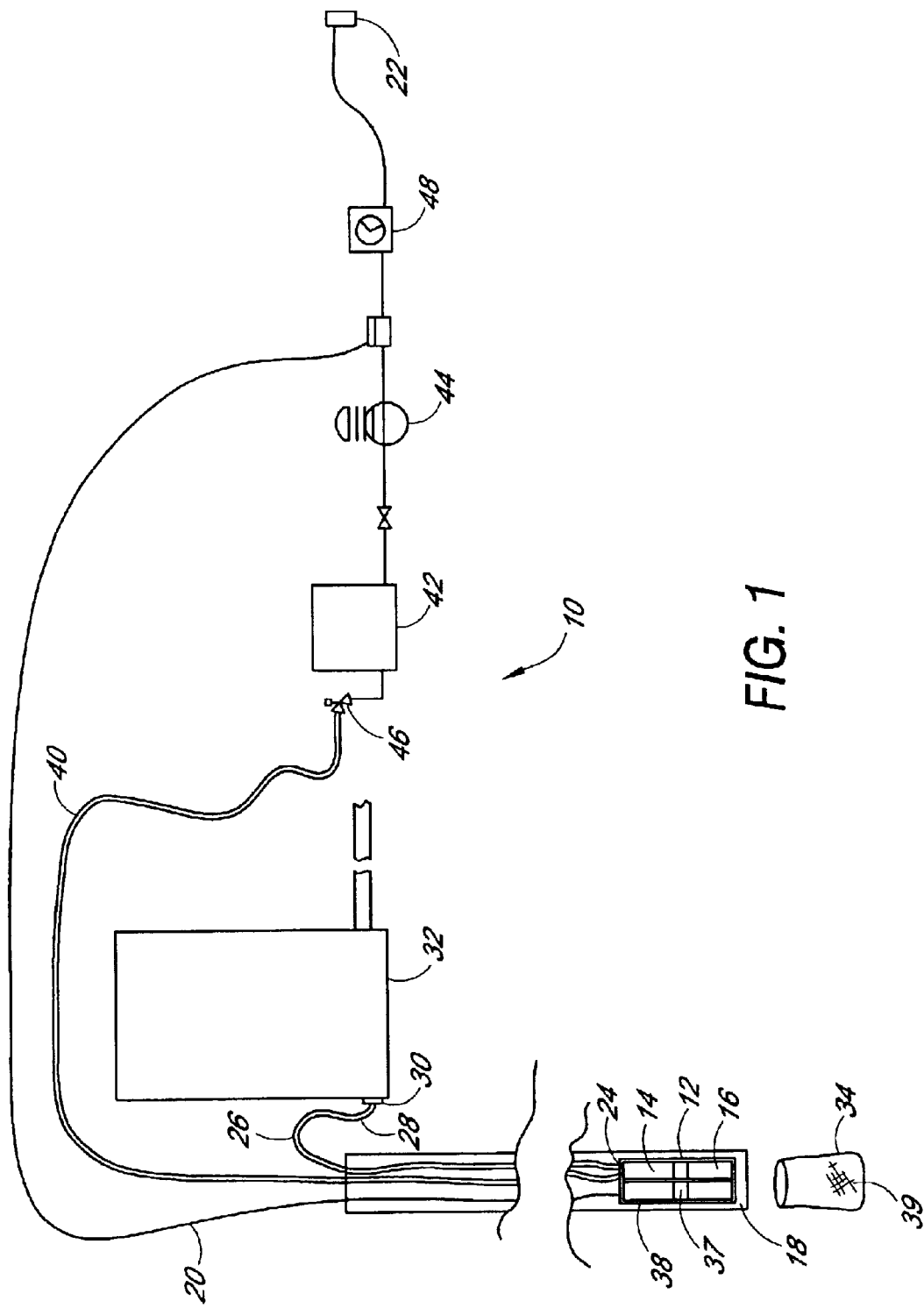
FIG. 1 is a schematic diagram of one embodiment of a system for pumping fluid using a self-cleaning filter apparatus according to one aspect of the invention.

Referring now to FIG. 1, a system 10 for pumping fluid from a well using a self-cleaning filter apparatus 12 is illustrated. The filter apparatus 12 encloses a submersible pump 14 in combination with an electric motor 16. The submersible pump 14 and electric motor 16 are preferably contained in a common housing and can be of conventional design. In one embodiment, the filter apparatus 12 and pump 14 are lowered into a typical well casing 18. An electrical supply line 20 connects an appropriate electrical power source 22 to the electric motor 16. A first end 24 of a pump discharge line 26 connects to the submersible pump 14. A second end 28 of the pump discharge line 26 is attached to a fitting 30 on a typical fluid tank 32 used for storing the pumped fluid. In operation, the filter apparatus 12 substantially prevents abrasive materials, such as sand, of a size that is equal to or greater than a predetermined size from entering the submersible pump 14. Although this embodiment illustrates the filter apparatus 12 being used with a system 10 to pump and filter water from a well casing 18, one skilled in the art will understand that the filter apparatus 12 can be used to filter other liquids or slurries, such as oil, gas, sewage, chemicals, industrial waste, and can be used to pump 14 liquids from oceans, lakes, rivers, ponds, streams, dewatering projects or any other source to any desired collection location. While FIG. 1 illustrates a submersible pump 14, some embodiments will not utilize a submersible pump 14, but rather will use a pump (not shown) above the surface of the fluid being pumped or near the tank 32. In such embodiments, only a suction end 24 of the line 26 will be used and the suction end 24 will be located in the filter apparatus 12.

The filter apparatus 12 has a filter element 39 (removed for clarity purposes) to screen out unwanted particles and abrasive materials such as sand and the like. In one embodiment, the filter element 39 is a filter sock 34 made of a synthetic fabric with 10-micron openings. One skilled in the art will understand that other filter elements 39 and/or different sized fabric openings designed to filter particulate material such as sand can also be used. For example, the filter element 39 can be a tube or filter material wrapped around the filter apparatus 12. As will be apparent from this description, any renewable filter capable of cleaning by backflushing can be used. Such filters include large mesh filters for filtering sand or rocks or other debris from water, or very small mesh filters and semipermeable membranes capable of filtering microscopic or even ionic particles from water, such as those capable of desalinating seawater for example. During the filtering operation, some of the particulate matter that the filter sock 34 screens out collects on the filter fabric. The quantity of particulate matter collected on the fabric of the filter sock 34 directly affects the pressure drop across the filter sock 34. Since an excessive pressure drop across the filter sock 34 can significantly reduce fluid flow and thereby adversely impact the performance of the pump 14, the filter sock 34 must be periodically changed or appropriately backwashed or flushed to clean the accumulated particulate material therefrom. One option, when the performance of the pump 14 drops to an unacceptable level, is to pull the pump 14 and filter apparatus 12 out of the well casing 18 and remove the filter sock 34 for cleaning or replacement. However, a more convenient and time saving remedy is available through back-washing or reverse-flushing the filter sock 34.

In one embodiment, such back-washing is accomplished by directing bursts of air to the interior of the filter apparatus 12 and spraying this air forcefully in an outwardly direction against interior surfaces of the filter sock 34. Such spraying action is created by use of relatively thin and elongated tubes 38 which have minute perforations or jets distributed along their lengths, and which are fed from an air source as will be more fully discussed below with respect to FIG. 2. Air bursts from the perforations impinge upon the interior surfaces of the filter sock 34 and dislodge or expel entrapped particulate material. The diameter of the tubes 38 determines the spacing between a pump suction inlet 37 on the pump 14 and the filter sock 34 by supplying a separation gap equal to the diameter of the tubes 38 between the filter sock 34 and the pump suction inlet 37. The tubes 38 prevent the filter sock 34 from being sucked into the pump fluid inlet. This permits substantially the entire area of the filter sock 34 to be utilized for filtering fluid flow.

The filter sock 34 is wrapped with an outer layer 39 made from a metal or plastic mesh-like material or perforated sheet material. The outer layer 39 protects the filter sock 34 from tearing while inserting the pump 14 and filter apparatus 12 in the well casing 18 or from snagging on rocks or sticks when the pump 14 is used in ponds or streams. The outer layer 39 also limits deformation of the filter sock 34 from the force of the blast of air during the cleaning process.

A conduit, such as a supply hose 40, is connected to the filter apparatus 12 for supplying a pressurized gas or liquid used to flush the filtered particles screened by the filter apparatus 12. In one embodiment, the supply hose 40 connects an air supply tank 42 to the filter apparatus 12. Although the following embodiment uses air, any other gas, such as carbon dioxide, nitrogen, chlorine dioxide anolyte, and the like, can be used. Alternately, a fluid, such as water can be used to flush the filter apparatus 12. An air compressor 44 pressurizes the air in the air supply tank 42. In one embodiment, a relief valve 46 is located in the air supply hose 40 between the air supply tank 42 and the filter apparatus 12. When it is desired to clean the filter, an operator turns on the compressor 44 and the pressure in the air supply tank begins to increase. When the pressure in the air supply tank 42 reaches the appropriate pressure, the relief valve 46 opens to allow a burst of air to be directed to the interior of the filter apparatus 12. In another embodiment, the relief valve 46 is replaced by a manual valve (not shown) in the air supply hose 40 between the air supply tank 42 and the filter apparatus 12 allowing an operator to provide a burst of air to the interior of the filter apparatus 12 either manually or through the use of a remotely operated valve. In one embodiment the valve is a solenoid valve allowing the flow of cleaning air to be controlled remotely by a switch or other remote control.

A control panel 48 may be provided that cooperates with the filter apparatus 12 and/or relief valve 46 such that the frequency of flushing can be programmed or occur in response to any desired signal. This allows the user to have greater flexibility in selecting when a flushing cycle is to be performed. Also, the allowable time for flushing can be pre-established and programmed into the control panel. Such a program is not necessary to perform any of the above cleaning procedures, since a user may effect such a cleaning procedure manually or semi-automatically. Use of such a control panel 48, however, allows for programming and automatic cleaning to suit a particular installation. Although not illustrated, some embodiments will use any number of pressure or temperature sensors to transmit signals to the control panel 48 from various sensing points in the system 10. These points may include the pump suction or discharge pressure, the air tank 42 pressure, or the flushing supply hose 40 supply pressure for example.

Figure 2:
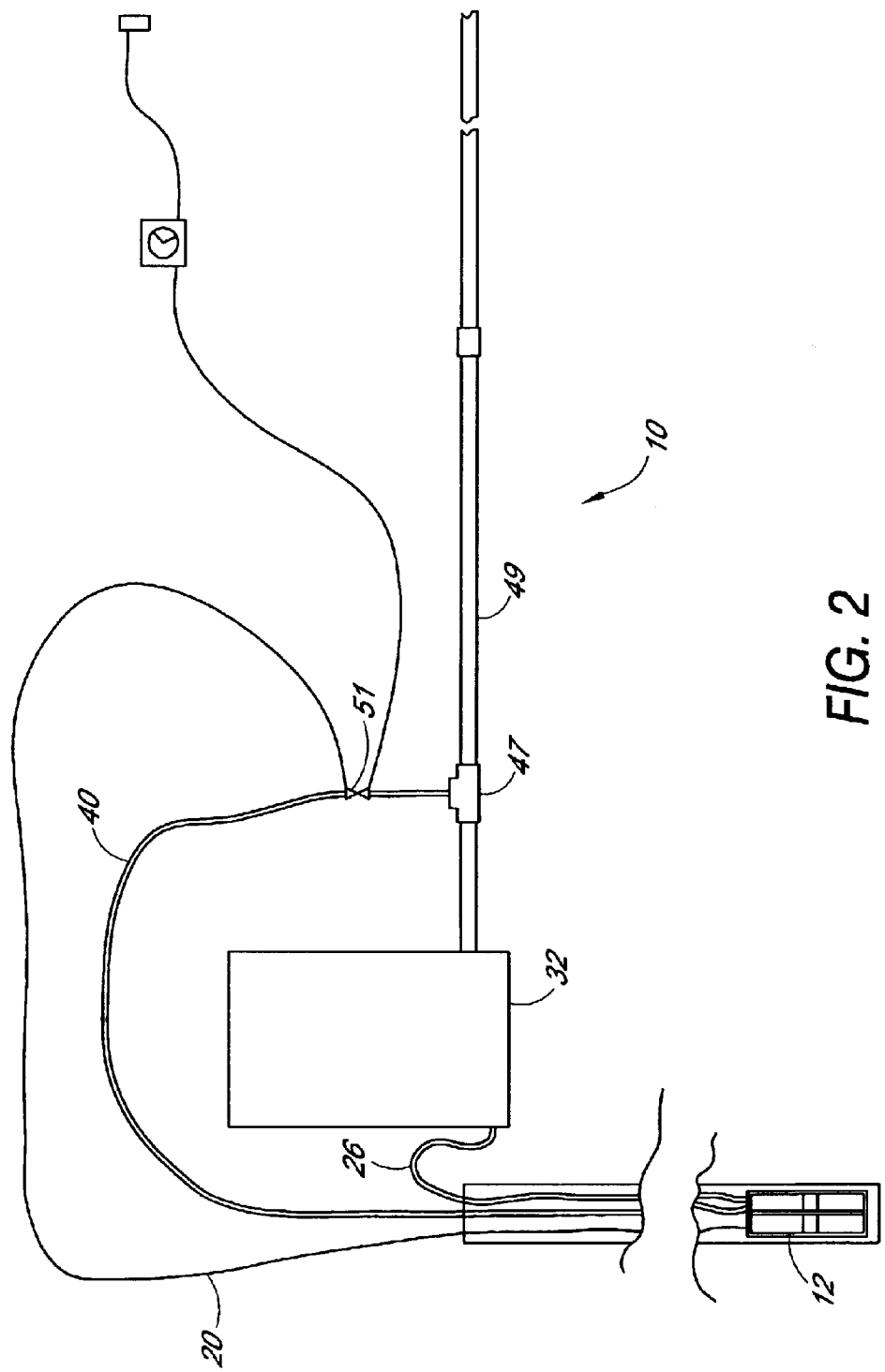
FIG. 2 is a schematic diagram of another embodiment of a system using the self-cleaning filter apparatus of FIG. 1 which uses the fluid being pumped to flush the filter apparatus.

FIG. 2 illustrates another embodiment of the system using the filter apparatus 12. The supply hose 40 can supply fluid from the tank 32 to provide a burst of fluid into the interior of the filter apparatus 12. A tee valve 47 in an output line 49 leading from the tank 32 can direct fluid back to the filter apparatus 12. A solenoid valve 51 is located in the supply hose 40 between tee valve 47 and the filter apparatus 12. The solenoid valve 51 can be controlled to provide flushing fluid flow to the apparatus at desired intervals. Additionally, the solenoid valve 51 can have a manual operator thereon to allow manual operation of the valve or the supply hose 40 can have a bypass (not shown) with a manual valve bypassing the solenoid valve 51 allowing an operator to control the flushing intervals.

Figure 3:
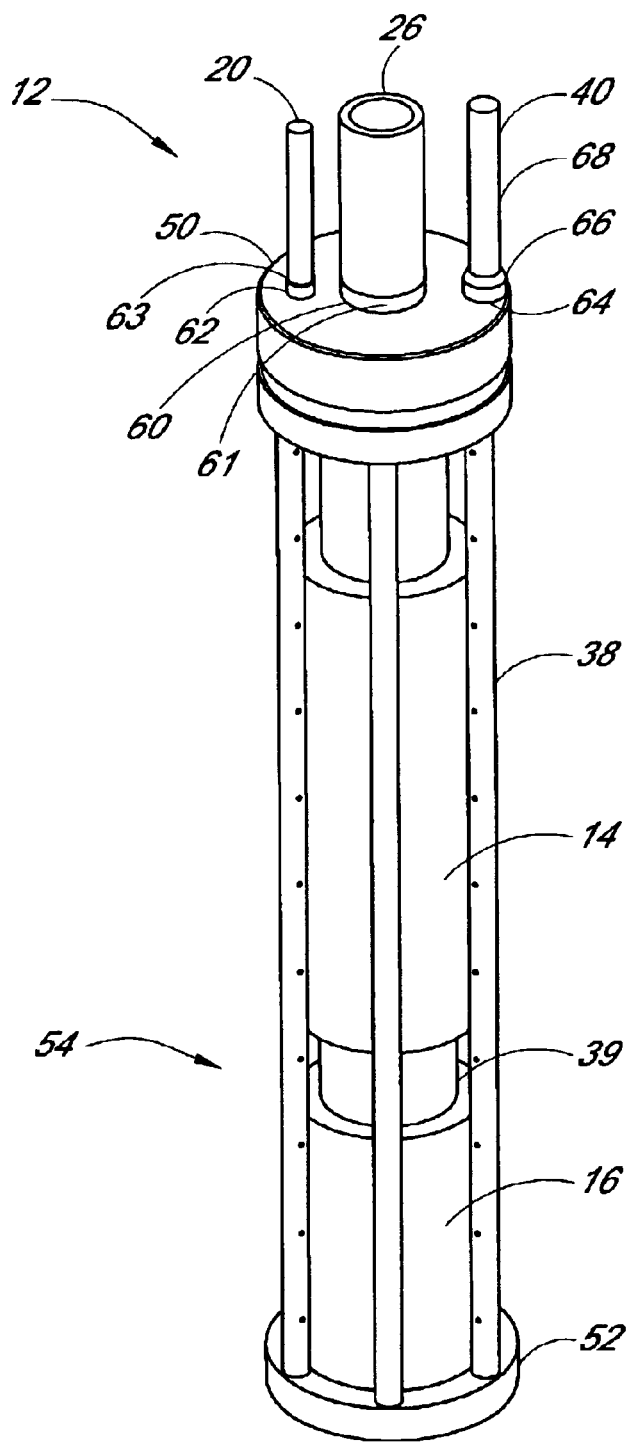
FIG. 3 is a perspective view of the filter apparatus of FIG. 1.

FIG. 3 illustrates one embodiment of the filter apparatus 12, shown without the filter sock 34, for clarity. The filter apparatus 12 has several hollow tubes 38 extending between a circular top manifold 50 and a circular bottom plate 52. In one embodiment, the tubes 38, the top manifold 50 and bottom plate 52 are made of polyvinyl chloride. However, other suitable materials such as fiberglass, metal and plastics can be used. In one embodiment, the tubes 38 are heat fused to the top manifold 50. Alternately, the tubes 38 are glued, threaded, welded or are otherwise fastened to the top manifold 50. The bottom plate 52 is heat fused to the tubes 38. Alternately, the bottom plate 52 is welded, glued or removably attached to the tubes 38 using fasteners. In the embodiment illustrated in FIG. 3, the filter apparatus 12 has six tubes 38 substantially evenly spaced around the outer circumference of the top manifold 50 and the bottom plate 52 to form a substantially cylindrical filter basket 54. Alternately, more or fewer tubes 38 can be used. The top manifold 50 and bottom plate 52 have a diameter large enough so that the submersible pump 14 and motor 16 will fit in the cavity 56 formed by the filter basket 54. One skilled in the art will appreciate that various sizes of filter baskets 54 can be manufactured to house different sizes and shapes of the pump 14 and motor 16 that will be received therein. For example, filter baskets 54 can be manufactured with internal diameters of, for example, 4 inches, 6 inches, 8 inches, 10 inches and 12 inches. Different numbers of tubes 38 can be used as desired, taking into account such factors as the size of pump 14 to be used inside the filter apparatus 12 and the pressure differential across the filter sock 34. For example, more tubes 38, such as 8 to 12, can be used in larger filter baskets 54 associated with larger pumps.

The top manifold 50 has a first hole 60 therein through which the pump discharge line 26 passes. A seal 61 extends around the pump discharge line 26 so as to fill any space between the line 26 and the periphery of the first hole 60. The top manifold 50 has a second hole 62 therein through which the electrical supply line 20 passes. A seal 63 is installed around the electrical supply line 20 so as to fill any empty space between the line 20 and the periphery of the second hole 62. The top manifold 50 also has a third opening 64 in a top surface thereof with an adapter 66 located within the opening 64 to receive a first end 68 of the air supply hose 40. The adapter 66 can be a threaded brass fitting for attaching the air supply hose 40 to the top manifold 50. The adapter 66 can also be made from other materials, such as plastic, metal and the like.

Figure 4:
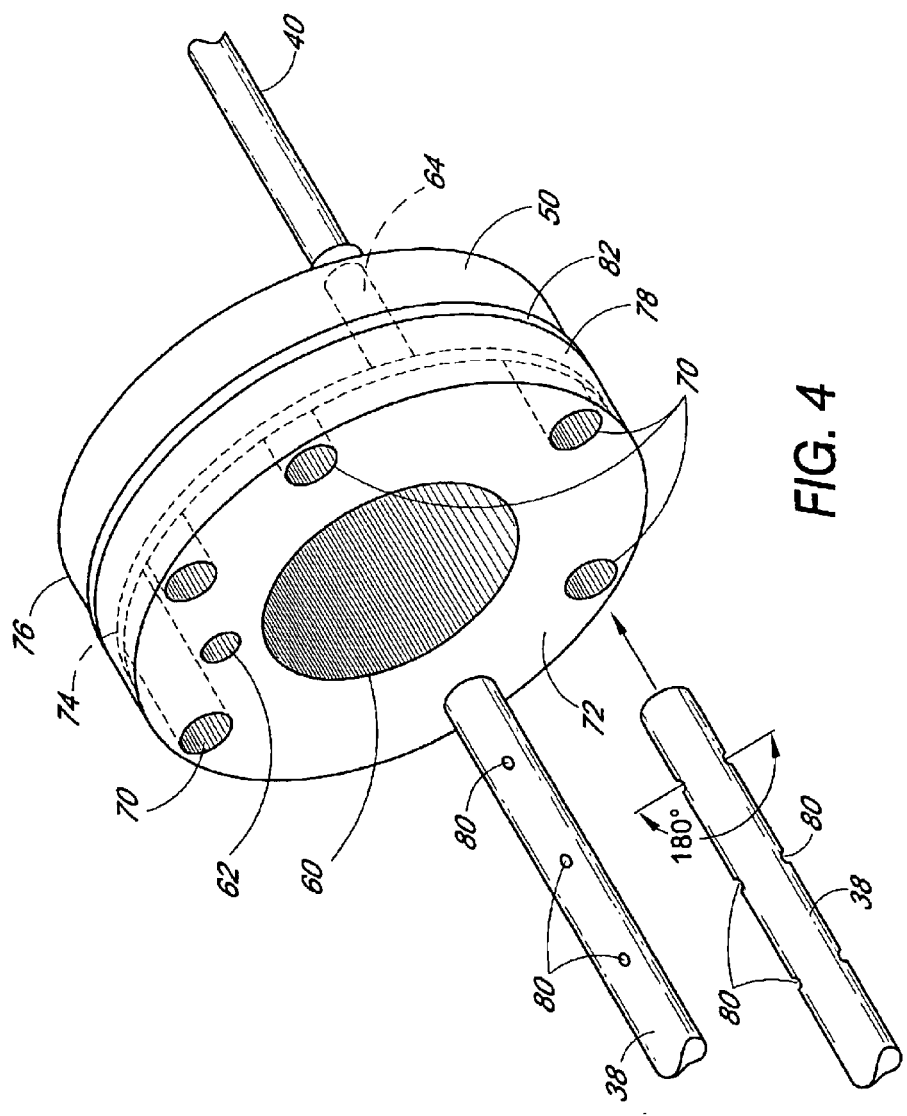
FIG. 4 is a perspective view of a manifold of the filter apparatus of FIG. 1, illustrating the openings and internal chamber in the manifold.

In FIG. 4 it is seen that the top manifold 50 has six tube apertures 70 located in the lower side 72 thereof. These apertures are each configured to receive a corresponding hollow tube 38. An internal concentric chamber 74 is located in the top manifold 50 to fluidly connect the third opening 64, to which the air supply hose 40 is attached, with the tube apertures 70 such that pressurized air from the air supply hose 40 passes into the hollow tubes 38. In one embodiment, the top manifold 50 can be made by aligning an upper plate 76 and a lower plate 78 to place corresponding grooves (not shown) on each plate in proper alignment, and then heat fusing, gluing, welding or bolting the plates 76 and 78 together so as to form the internal chamber 74. Of course any other method of making the manifold 50 can be used.

Each tube 38 contains a number of perforations or jets 80 therein. When pressurized air is inserted into the tubes 38, the air escapes out the perforations 80. In one embodiment, the perforations 80 are arranged in two rows spaced about 180 degrees apart around the tube 38 to direct the burst of air along the inner surface of the filter sock 34. Alternatively, the rows of perforations 80 can be placed at angles less than 180 degrees apart to direct the air blasts more directly against the filter sock 34. The perforations 80 are longitudinally spaced along the hollow tubes 38 to provide air bursts along substantially the entire length of the hollow tubes 38. In one embodiment, the perforations 80 are spaced approximately every three inches along the tube 38 of about three inches between perforations, however, other spacing can be used.

The filter sock 34 (See FIG. 1) is shaped like a tube sock. The diameter of the filter sock 34 is such that it may be snugly slid over the filter basket 54 formed by the tubes 38. The length of the filter sock 34 is at least long enough to cover the tubes 38. The upper perimeter of the filter sock 34 preferably is sealed in a groove 82 in the perimeter of the manifold 50 by a suitable, easily removable tape, band, strap or any other retainer to prevent particles from gaining access to the interior of the filter basket 54 through an open end of the filter sock 34. In an embodiment where the filter element is a tube or the like, a lower perimeter of the filter element can be sealed in a similar manner.

The filter apparatus 12 (FIG. 1) is installed around the pump 14 and motor 16 by removing the bottom plate 52 and sliding the pump and motor into the filter basket 54. The pump discharge line 26 is fed through the first hole 60 in the manifold. The electrical supply line 20 is fed through the second hole 62 in the manifold 50. The air supply hose 40 is attached to the adapter 66 on the manifold 50. The seals 61 and 63 are then installed on the electrical supply line 20 and pump discharge line 26. The bottom plate 52 is then attached to the tubes 38 and the filter sock 34 is slid over the filter basket 54. In another embodiment, the bottom plate 52 can be a ring with an opening therein. In this embodiment, the bottom ring 52 can be permanently attached to the tubes as described above. The pump 14 is inserted into the filter basket 54 through the opening. A seal on the bottom ring 52 conforms to an outer surface of the pump 14. The seal can be an o-ring or a flashing capable of creating a seal with various sizes of pumps.

In operation, the filter apparatus 12 containing the pump 14 and motor 16 is lowered into a fluid containing particulate material that is to be pumped. The fluid is sucked through the filter sock 34 that is stretched around the filter basket 54 which removes the particulate matter. The fluid then passes into the confines of the filter basket 54 and then into the fluid inlet of the pump 14. Particulate material removed from the fluid is collected on the outer surface of the filter sock 34. The outer surface of the filter sock 34 must be periodically flushed. To flush the filter sock 34, air, gas, or cleaning fluid is directed down the air supply hose 40 and into the internal chamber 74 of the top manifold 50. The air, gas, or cleaning fluid is then distributed in the chamber 74 to each of the hollow tubes 38. The air, gas, or cleaning fluid then escapes out of the hollow tubes 38 through the perforations 80 and is directed against the inner surface of the filter sock 34. The flow of air, gas, or cleaning fluid in the reverse direction removes the particulate material that has collected on the outer surface of the filter sock 34.

In another embodiment, the filter apparatus 12 can be placed on the end of a pump suction line that is lowered into the fluid to be pumped. In this embodiment, the design of the filter basket 54 is substantially the same, except that no electrical supply line passes through the manifold and the pump suction line passes through the manifold instead of the pump discharge line.

In another embodiment for use in pumping from fluid supplies containing flammable fluids, the filter basket and the supply hose can be made from flame and heat resistant materials. If a fire were to break out in the fluid supply, the system can be used to deliver an extinguishing agent, such as carbon dioxide.

Figure 5:
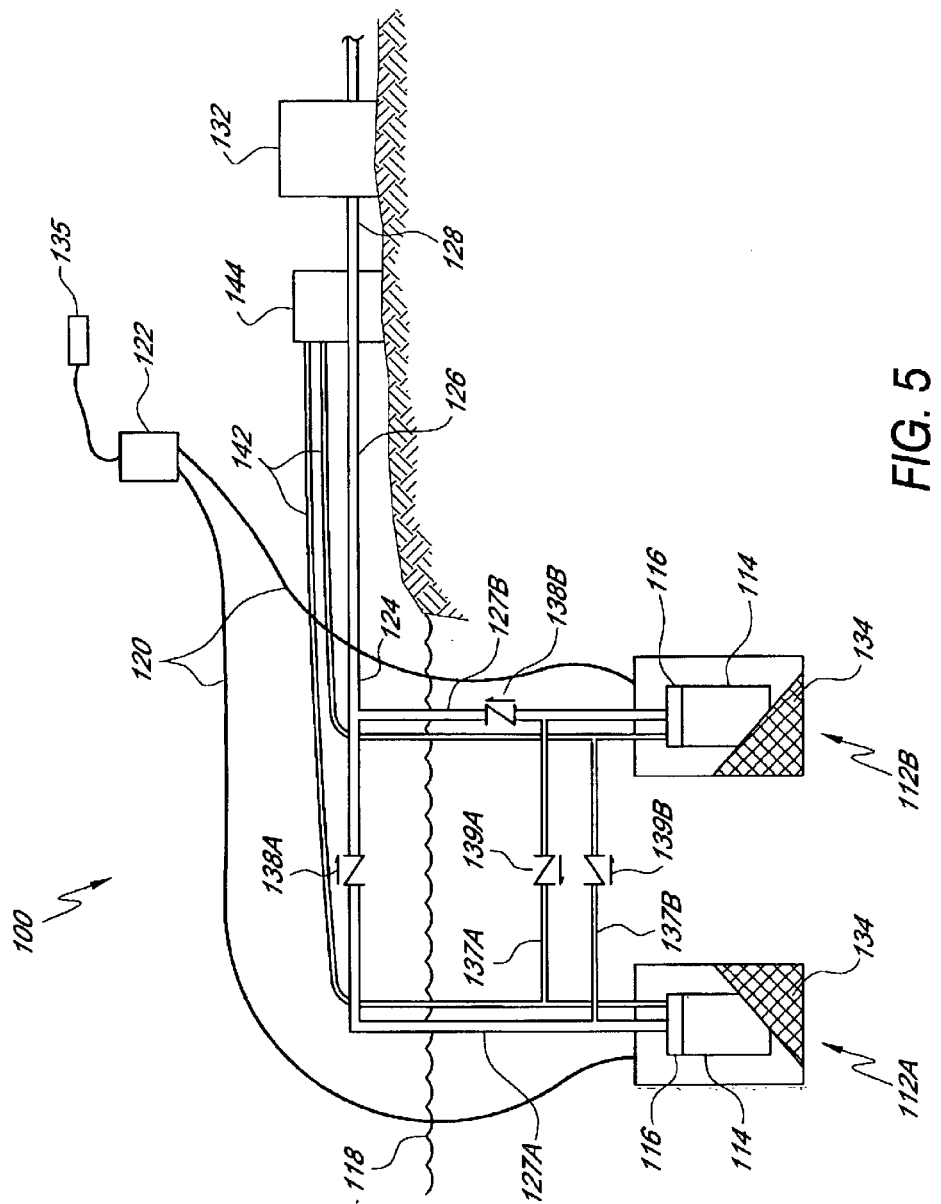
FIG. 5 is a schematic diagram of another embodiment of a system for pumping fluid using multiple self-cleaning filters according to one aspect of the invention.

Referring now to FIG. 5, a system 100 for pumping fluid from a well or fluid source using multiple self cleaning filters 112 is shown. FIG. 5, for example, illustrates an embodiment of the system 100 with two self-cleaning filters 112A and 112B. However, more filters 112, such as three, four, or more can be used in the system 100. In the embodiment illustrated, each filter apparatus 112A and 112B encloses a submersible pump 114A,B in combination with an electric motor 116A,B, however less or more pumps 114 can be used in the system 100. Each submersible pump 114A,B and its associated electric motor 116A,B are preferably contained in a common housing and can be of conventional design. In one embodiment, the filters 112A and 112B and pumps 114A,B are lowered into a fluid source 118. An electrical supply line 120 connects an appropriate electrical power source 122 to the electric motors 116A,B.

A first end 124 of a main discharge line 126 separates into two pump discharge branches 127A and 127B. The pump discharge branches 127A and 127B connect to the submersible pumps 114A,B in the filters 112A and 112B, respectively. In embodiments with more than two filters 112A,B, the main discharge line 126 will branch into multiple pump discharge branches so that each filter is connected to the main discharge line 126. A second end 128 of the pump discharge line 126 is attached to a typical fluid tank 132 used for storing the pumped fluid. In operation, each filter apparatus 112A,B substantially prevents the material to be removed by the filter, such as particles, salt, ions or other material that is desired to be filtered, from entering the submersible pump 114A,B. Although this embodiment illustrates the filters 112A and 112B being used with a system 100 to pump and filter water from a fluid supply, such as a pond, one skilled in the art will understand that the filters 112A and 112B can be used to filter other liquids, such as sea water, brackish water, salt water, oil, gas, sewage, chemicals, industrial waste, and can be used to pump liquids from ponds, streams, dewatering projects or other sources to any desired collection location. In one embodiment, the filters 112A,B are placed at a depth below the surface of the fluid 118 to be filtered such that the pressure of the fluid forces the fluid through the filter 112A,B.

Each filter apparatus 112A and 112B has a filter element 134 (partially removed for clarity purposes) to screen out unwanted dissolved or suspended particles and colloids, ions, microorganisms, pyrogens and viruses, other dissolved organics and inorganics, or abrasive materials such as sand and the like. In one embodiment, the filter element 134 comprises a filter sock made of a synthetic fabric with 10-micron openings. In other embodiments, the filter element 134 can comprise a membrane suitable for particle filtration, microfiltration, ultrafiltration, nanofiltration or reverse osmosis. Any other filter elements 134 and/or filtration media with different sized openings designed to filter impurities can also be used. For example, the filter element 134 can be a tube or filter material wrapped around the filter apparatus 112A,B. During the filtering operation, some of the matter that the filter element 134 screens out collects on the outside of the filter element 134. The quantity of matter collected on or in the filter element 134 affects the pressure drop across the filter element 134. Since an excessive pressure drop across the filter element 134 can significantly reduce fluid flow and thereby adversely impact the performance of the pump 114, or damage the filter element 134, the filter element 134 must be periodically changed or appropriately back washed or flushed to clean the accumulated particulate material therefrom.

In one embodiment, an electric control box 135 programs the pumps 114A,B to pump in alternate pumping cycles. For example, as the pump 114A is pumping the filtered fluid through filter 112A and the branch pump discharge 127A to the supply tank 132, a portion of the pumped fluid is directed through a first cross connect line 137A to back flush or clean the other filter 112B. Branch line check valves 138A and 138B direct the flow in the desired direction in the pump discharge branch lines 127A and 127B. A second cross connect line 137B is used when the other pump 114B is operating to back flush or clean the filter 112A. Cross-connect check valves 139A and 139B direct the flow of fluid through the cross connect lines 137A and 137B in the proper direction. The system 100 can automatically alternate pumps 114A,B through the electric control lines 120 and the control box 135. With multiple pumps 114A,B, continuous fluid discharge can be provided to the tank 132 as desired or required, and a flushing fluid can simultaneously back flush and clean the filter elements 139 of a non-operating filter 112A,B.

In one embodiment, the pumps 114A,B are not located in the filter assemblies 112A,B but instead are located above the surface of the fluid 118 to be pumped, as described above. In this embodiment, the lines 127A,B are non-collapsible pump suction lines 127A,B that extend down into the filter assemblies 112A,B and provide the suction. In this case, the pumps may be in the discharge tank 132 or outside of it. The flow of cleaning fluid through cross-connect lines 137A,B can still be controlled by cross-connect check valves 139A,B. In many embodiments utilizing control of cross-connected flushing flow, the cross-connect check valves 139A,B will be remotely operated stop-check valves capable of stopping, starting and throttling flow, but only in one direction. Additionally, in many of the embodiments described herein, discharge valves 138A,B will be remotely operated stop-check valves as well.

In one embodiment, cleaning additive supply lines 142 can also connect to the filters 112A and 112B. An injection system (not shown) connected to a cleaning supply tank 144 filled with a cleaning fluid can be used to supply additional cleaning solutions or gasses to clean and/or disinfect the filters 112A,B.

In one embodiment, such back-washing is accomplished by directing bursts of a flushing fluid to the interior of the filter apparatus 112A,B and spraying this fluid forcefully in an outwardly direction against interior surfaces of the filter element 134 as explained above. The filter element 134 also can be wrapped with an outer layer made from a metal or plastic mesh-like material or perforated sheet material as described above to add mechanical strength to the filter element 134 and provide filtering as well. In some embodiments, another manifold (not shown) with either an additional or a separate supply line (not shown) and a set of additional tubes (not shown) on the outside of filter element 134 may be added to the filter assembly 112A,B. The addition of such an additional portion of a system will allow fluid being filtered to also be disinfected by injecting cleaning solution or gas through the additional supply line, into the additional manifold, into the additional outside tubes and out of the orifices therein thus mixing with the fluid to be filtered that is being forced through the filter fabric. This will assist these embodiments in preventing unwanted organisms from growing on the filter element 134. Then, after such filtering and disinfecting/treatment, this fluid may be ready for its desired use. By mixing a cleaning solution and or gas with the fluid being filtered prior to filtration, the accumulated filtered material on the fabric will be much easier to backwash. This additional set of tubes will also help protect and hold the filter element 134 in place, especially when high pressures or velocities are required to back flush the fabric.

Still referring to FIG. 5, certain embodiments of the filter assembly 112 are used in existing mechanical systems as well. Rather than mounting the system 100 above the surface of a fluid 118 to be filtered, the filter apparatus can be inserted into a tank (not shown) or other pressure vessel (not shown) wherein a pressure differential can be established across the filter element 134 to provide a motive force for driving the fluid through the filter element. Some embodiments of the filter assembly 112 are utilized in oil systems where impurities exist in suspension or otherwise and must be removed to improve the lubricating characteristics of the oil. In these embodiments, the filter assembly 112 can be placed in an area downstream of the oil pump, wherein the pump supplies the differential pressure across the filter element 134. In many embodiments, the filter assembly 112 will be placed in a part of the system where a drain plug or automatic drain valve (not shown) can periodically be used to drain sediment collecting in the vicinity of the outside of the filter element 134. Such embodiments will use any of the other variations described herein to accomplish the purpose of the system, namely recirculating fluid to flush the sediment from the outside surface of the filter element 134. Some such embodiments will allow a portion of the filtered oil to recirculate as the flushing fluid as described elsewhere herein. One such oil system 100 could be a car oil, transmission or fuel system where the filter assembly 112 is installed as an additional filtration system 100 designed to operate as a replacement for, in series or in parallel with the existing replaceable fluid system filters. However, the system 100 can be used in ships, trains, large equipment or any other machinery lubrication system. The filtration material used in such systems 100 may be any material suitable for filtration in the particular application.

Alternatively, some embodiments of the system 100 will be used in other filtration systems requiring the filtration of sediment or other particles. One such system is a wastewater treatment system. In such systems, the filter assembly 112 filters impurities from the fluid while allowing the flushing fluid to periodically remove the sediment settling out from the outer surface of the filter element 134. Again, the filter assembly 134 can be in a tank, a pressure vessel, a pipe or a special enclosure wherein a differential pressure across the surface of the filter element 134 causes flow of the fluid through the filter element 134. In these systems, any of the filter materials described elsewhere herein can be used. For instance, in some embodiments filtration mesh may be used to remove large or bulk substances from the fluid for rapid remediation of highly contaminated water, or the system 100 can be used in the final filtration process to remove microbes, volatile organic compounds, or other particulate or dissolved impurities.

In another embodiment, the system 100 is used in applications that utilize the pressure created by a fluid height to produce the differential pressure needed to overcome the resistance of the filter element 134. One such application is a hilltop or mountain source or reservoir. A pipe or other fluid conducting system capable of withstanding relatively high pressures as needed or required, such as culverts, can be used to conduct the fluid from a height at which it is stored, down to the system 100 where it is to be filtered. The fluid height leading from the elevated source down to the system 100 and the filtered water level will develop a pressure if the water is contained. This pressure is applied to the outside surface of the element in these embodiments to create flow of the fluid through the filter assembly 112 and out of the assembly. This filter system 100 is self-cleaning and requires no external power to create the filtered water, although the filtered water may need to be transported elsewhere thereby utilizing power. The height required to create sufficient pressure across the filter element 134 will depend upon the type of filter element 134 utilized. The greater the flow resistance created by the filter element 134, the larger the fluid height will have to be. As described elsewhere herein, either some of the filtered fluid will be recirculated for flushing the filter assembly 112, or a separate flushing line 142 will be utilized to flush the filter assembly 112.

Other embodiments will utilize other natural sources of pressure to cause flow through the filter element 134. These sources can be geothermal or any other source of natural pressure. One embodiment utilizes the natural pressure of oil wells to remove undesired impurities, dissolved or particulate, from the oil removed from the wells, thereby conserving the energy needed to perform this filtration after the oil has been removed from the ground. The pressure of the oil leaving the well will provide motive force to drive the flushing fluid, some of the filtered oil in this case, through the filter assembly 112 to backflush the filter element 134. Another embodiment uses the geothermal pressure of water in aquifers and other underground sources. The pressure created by the heating of the water provides the pressure necessary to cause flow in these systems 100 through the filter element 134. Again, the type of filter element 134 will determine the amount of pressure needed, therefore, not all geothermal sources will be able to provide enough pressure for some of the high differential pressure filter materials. Water filtered in these systems 100 can be disinfected as described above as well as filtered to provide the desired quality of output water. These are just a few examples of embodiments of the invention contemplated herein, and any source of pressure can be used to create flow of a fluid to be filtered through the filter assembly 112. These systems can use external flushing systems such as those described above with respect to FIGS. 1 and 2 to provide the motive pressure for flushing the filter element 134, or any other system to provide such pressure. Additionally, any other mechanical devices and systems can be used from the hydraulic pressure of the fluid source to create the pressure in the flushing line. This is true whether that hydraulic pressure be from the fluid height of elevated fluid source, from the pressure of the pressurized oil well or geothermic well, or existing lubricating systems in machinery or cars. Such equipment may include, in some embodiments turbo-pumps powered by the hydraulic pressure of the fluid being filtered to pressurize the flushing line. It is intended that these embodiments can utilize such energy conversion to operate the filtration system 100 and apparatus 112 using as little external energy or electricity as possible.

Figure 6:
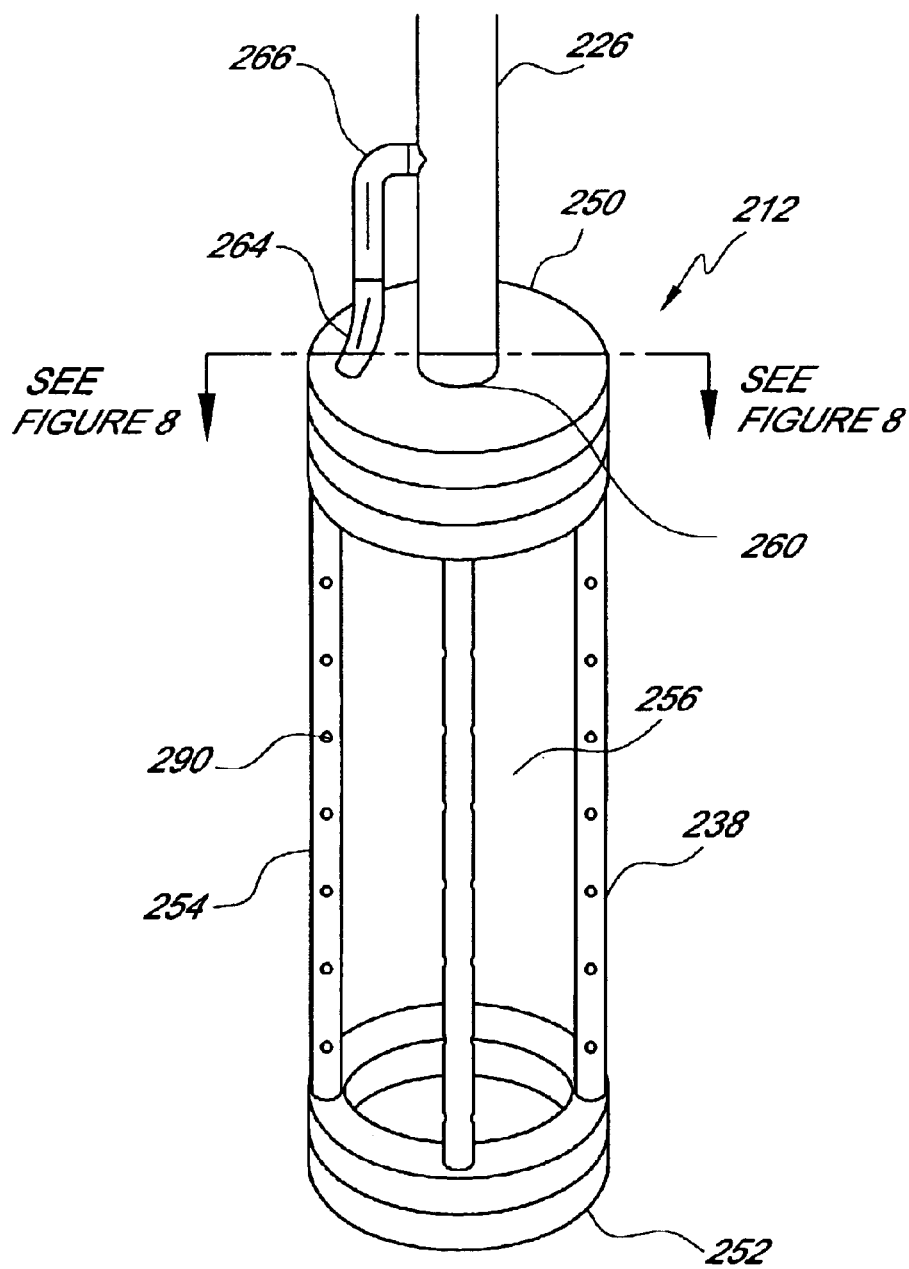
FIG. 6 is a perspective view of a filter apparatus according to one embodiment of the invention.

FIG. 6 illustrates an embodiment of a filter apparatus 212, shown without a filter element 139 for clarity, that is capable of directing a cleaning fluid flow against the filter element 139 during pump 114A,B operation. The filter apparatus 212 has several hollow tubes 238 extending between a circular top manifold 250 and a circular bottom plate 252. In one embodiment, the tubes 238, the top manifold 250 and bottom plate 252 form a filter basket 254 and are made of polyvinyl chloride. However, other suitable materials such as fiberglass or other composites, metals and plastics can be used. In some embodiments, the material used will depend on the application of the system 212. For instance, if a deep seawater application is desired, the material will be chosen such that it can withstand the hydraulic, corrosive and mechanical effects of such an application. Suitable materials for such an application might include, for example, stainless steel, titanium, inconel, or other alloys such as nickel-copper, or very strong plastics or composites. In one embodiment, the tubes 238 are heat fused to the top manifold 250. Alternately, the tubes 238 are glued, threaded, welded or fastened to the top manifold 250.

Still referring to FIG. 6, the bottom plate 252 is heat fused to the tubes 238. Alternately, the bottom plate 252 is welded, glued or removably attached to the tubes 238 using fasteners. In one embodiment, the filter apparatus 212 has six tubes 238 substantially evenly spaced around the outer circumference of the top manifold 250 and the bottom plate 252 to form a substantially cylindrical filter basket 254. Alternately, more or fewer tubes 238 can be used. Each of the tubes 238 has a number of orifices or perforations 290 running the length of the tube 238 for ejecting the fluid running through the tube 238. The perforations 290 can simply be holes in the side of the tube 238 or they can have varying shapes to create any number of velocity and spray pattern effects that the particular application may require. For instance, each perforation 290 may be larger on the inside of the tube 238 and get smaller toward the outside of the tube 238 to increase the velocity through the tube. In another embodiment, the perforations 290 are larger as they are farther away from the bottom plate 252 in order to evenly distribute the fluid along the length of the tubes 238. The perforations 290 are distributed in one or more rows in one embodiment, while in other embodiments, the perforations 290 are not linearly located with respect to one another. In some embodiments, the perforations 290 are located in rows that face radially outward from the center of the filter apparatus 212 towards the surface of the filter element (not shown), while in other embodiments, the rows of perforations 290 from each tube 238 are not directed directly radially outward from the center of the filter apparatus 212. In such embodiments, the fluid directed from the perforations 290 will interact from fluid directed from perforations 290 from an adjacent tube 238 while impinging the inner surface of the filter element (not shown).

The top manifold 250 and bottom plate 252 have a diameter large enough so that a submersible pump (not shown) and a motor (not shown) will fit in a cavity 256 formed by the filter basket 254. One skilled in the art will appreciate that various sizes of filter baskets 254 can be manufactured to house different sizes and shapes of the pump and motor that will be received therein. For example, filter baskets 254 can be manufactured with internal diameters of, for example, 4 inches, 6 inches, 8 inches, 10 inches and 12 inches, but they may be larger or smaller as well. Different numbers of tubes 238 can be used as desired, taking into account such factors as the size of pump to be used inside the filter apparatus 212 and the pressure differential across the filter sock 134. For example, more tubes 238, such as 8 to 12, can be used in larger filter baskets 254 associated with larger pumps.

The top manifold 250 has a first hole 260 therein through which a pump discharge line 226 passes. A seal (not shown) extends around the pump discharge line 226 so as to fill any space between the line 226 and the periphery of the first hole 260 as described above. The top manifold 250 has additional holes therein (not shown) through which the electrical supply line passes as described above. The top manifold 250 also has a third opening 264 in a top surface thereof with an adapter to receive a flushing fluid line 266. Preferably, the flushing fluid line 266 is connected to the discharge line 226 such that a portion of the fluid being pumped is returned to the filter 212 as a flushing fluid. However, the flushing line 266 can also include a valve (not shown) to control flow through it and can also be connected to an external cross-flow flushing system as described above. As can be seen, in this embodiment, the pump within the filter apparatus 212 supplies the force to pressurize the flushing fluid to clean the filter apparatus 212. In some embodiments, a tee joint (not shown) will be used instead of a 90-degree bend from pump discharge line 226 for flushing fluid supply line 266, and check valve (not shown) is placed in line 266 so that a cleaning solution/fluid can be incorporated in the back flushing and treatment of fluid being filtered. In some embodiments using a suction line and no pump (not shown) in the filter assembly 212, flushing fluid line 266 can be connected to a pressurized line (not shown) to supply flushing/cleaning fluid to the filter apparatus 212. Such tee joints can be especially useful for adding flushing lines 266 to those systems 100 described above that are added to already existing systems, such as car oil systems, transmission fluid systems, geothermal water filtration systems, pressurized oil well filtration systems, or any other systems utilizing backflushing not directly provided from the filtration apparatus 212 itself.

In one embodiment, the bottom plate 252 can be a ring covered by the filter medium such that some fluid flow can pass into the filter basket 254 through the bottom plate 252.

In one embodiment, the filter basket extends past the motor to allow sufficient area of filter material so that there is a cooling flow past the motor. Additionally, the filter basket 254 can be constructed so that the manifold 250 only covers a portion of the top of the filter basket such that the remaining portion of the top of the filter basket is covered with filter material so that this area can be used to filter incoming fluid.

Figure 7:
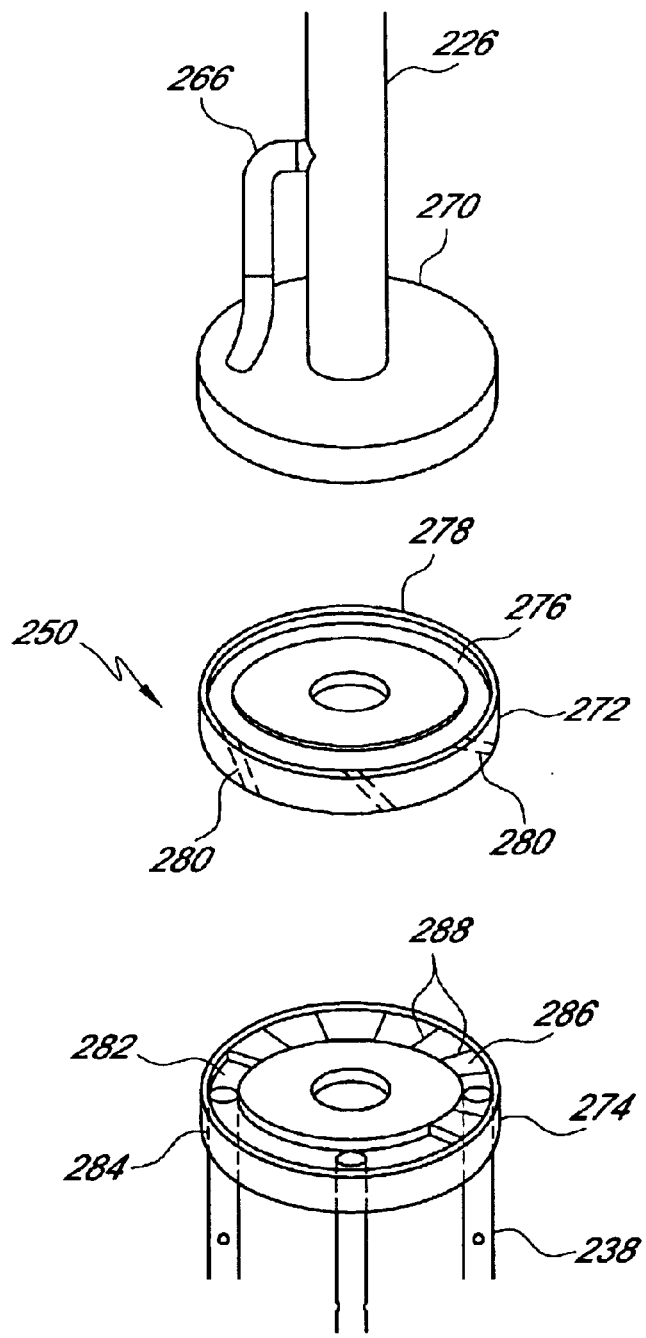
FIG. 7 is an exploded view of a manifold of a filter apparatus of FIG. 6.
Figure 8:
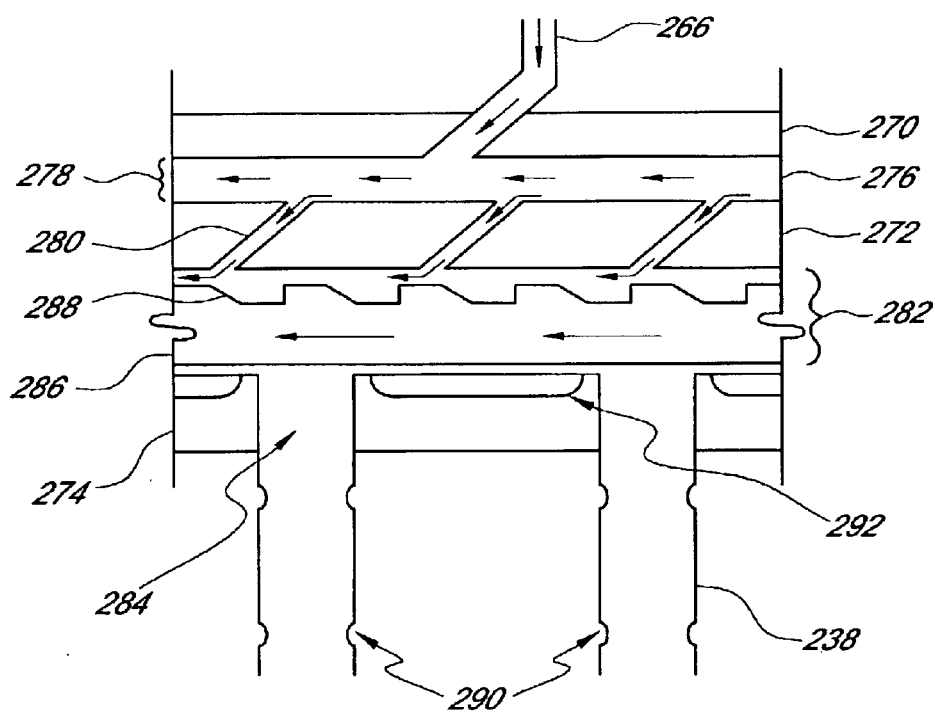
FIG. 8 is a cross sectional view of a manifold portion of the filter apparatus of FIG. 6, taken along line 8—8 of FIG. 6.

FIG. 7 is an exploded view of the manifold 250 and illustrates that in some embodiments the manifold 250 has a top plate 270, a middle plate 272, and a bottom plate 274. FIG. 8 is a cross-sectional view of the manifold 250. FIGS. 7 and 8 illustrate that the middle plate 272 has a first slot chamber 276 formed in an upper portion 278 of thereof. The first slot chamber 276 is configured to receive a flow flushing fluid from the flushing fluid line 266. In one embodiment, the flushing fluid line 266 passes through the top plate 270 at an angle so that the flushing fluid flows in either a clockwise or counterclockwise motion in the slot chamber 276. The middle plate 272 has at least one opening 280 extending through the middle plate 272. In some embodiments, the middle plate 272 has several openings 280 with at least one, in some embodiments, associated with each one of the tubes 238. In one embodiment, the openings are spaced substantially equidistant from one another around the middle plate 272.

The bottom plate 274 has a second slot chamber 282 formed in an upper portion thereof. The bottom plate 274 has a number of tube apertures 284 located in the lower side thereof connecting the second slot chamber 282 with the tubes 238. These apertures 284 are each configured to receive the corresponding hollow tube 238 as described above. Each tube 238 contains a number of perforations 290 or jets therein. When a pressurized flushing fluid is introduced into the tubes 238, the flushing fluid escapes out the perforations 290 and is directed against the filter element (not shown). The flushing fluid is of sufficient pressure so that as the flushing fluid is directed against the inside wall of the filter element, it overcomes the inward force caused by the pump intake (not shown) and the pressure of the of fluid to be filtered so that, at least in an area adjacent to the perforation 290, there is a net flow of fluid from the interior of the filter element to the exterior of the filter element, thereby removing particles entrapped on or in the filter element and cleaning the filter element.

In some embodiments, the openings 280 extend through the middle plate 272 at an angle or are otherwise designed to increase the velocity of the fluid. In some embodiments, the openings 280 extend through the middle plate 272 at an angle between 20 at 60 degrees, although any design to generate angular velocity in the fluid passing through the openings 280 can be used. The various design choices, such as angles and shapes, for various embodiments will utilize the pressure-velocity relationships of the fluid in these confined spaces to accelerate the fluid flowing through the openings 280. The flushing fluid flowing in a circular motion in the first slot chamber 276 enters the openings 280 and is projected through the middle plate 272 and into the second slot chamber 282 in the bottom plate 274. The pressurized fluid flowing at an angle causes a circular fluid flow in the second slot chamber 282 in the bottom plate 274.

An arcuate blocking piece 286 is positioned in the second slot chamber 282. The blocking piece is shaped so that it fits in the second slot chamber and is free to rotate around the bottom plate 274 in the second slot chamber 282. During operation, the blocking piece 286 is pushed in a circular motion around the bottom plate 284 by the pressurized flushing fluid flow. As the blocking piece 286 moves around the second slot chamber 282, it periodically covers one or more of the apertures 284 leading to the tubes 238. Accordingly, when the blocking piece 286 is covering an aperture 284 leading to a particular tube 238, flushing fluid is prevented from entering the tube 238, or is otherwise restricted.

The blocking piece 286 can be designed to simultaneously cover and uncover as many apertures 284 as desired. In some embodiments, only one aperture 284 is uncovered at any one time, while in other embodiments multiple or many apertures 284 can be uncovered. During the times when little or no flushing fluid is entering the tube 238, fluid to be filtered and pumped can freely pass through the filter element. In some embodiments, the blocking piece 286 has a number of vanes 288 on an upper surface thereof. The fluid flowing through the openings 280 in the middle plate 272 impinges on the vanes 288 and aids in causing the blocking piece 286 to rotate around the bottom plate 274 in the second slot chamber 282.

The vanes 288 can be designed in various ways to accept the kinetic energy of the fluid flowing through the openings 280 to cause rotation of the blocking piece 286. The vanes can be flat notches cut radially out of the blocking piece 286, or they can have angled or curved leading or trailing edges.

In some embodiments of the invention, the openings 280 are located radially outside of the first slot chamber 276 and are directed down to bottom plate 274 to the outer edge of the second slot chamber 282. In these embodiments, the openings 280 continue down from the middle plate 272 to the lower plate 274 and then are directed partially radially inward and at a tangential angle to impinge on the radially outward edge of the blocking piece 286 where the fluid flow can be directed at a tangential angle inward toward the blocking piece 286 and parallel to its movement. The vanes 288 on the blocking piece 286, in these embodiments are on the radially outside edge of the blocking piece 286, thus receiving the flow and kinetic energy from the openings 280. These embodiments will reduce a downward force on the blocking piece 286 allowing easier movement due to increased horizontal force, where the filter assembly 212 is in a vertical position, which results in less restriction of movement of the blocking piece 286. These are design choices that are made in several embodiments and can be implemented as seen fit for each application.

Still referring to FIG. 8, one or more intermittent grooves 292 can be added to the upper face of the bottom plate 274 in an annular direction with each groove 292 positioned between two adjacent apertures 284. The use of one or more grooves 292 in some embodiments helps reduce friction between the blocking piece 286 and the bottom plate 274, thereby facilitating rotation of the blocking piece 286.

Figure 9:
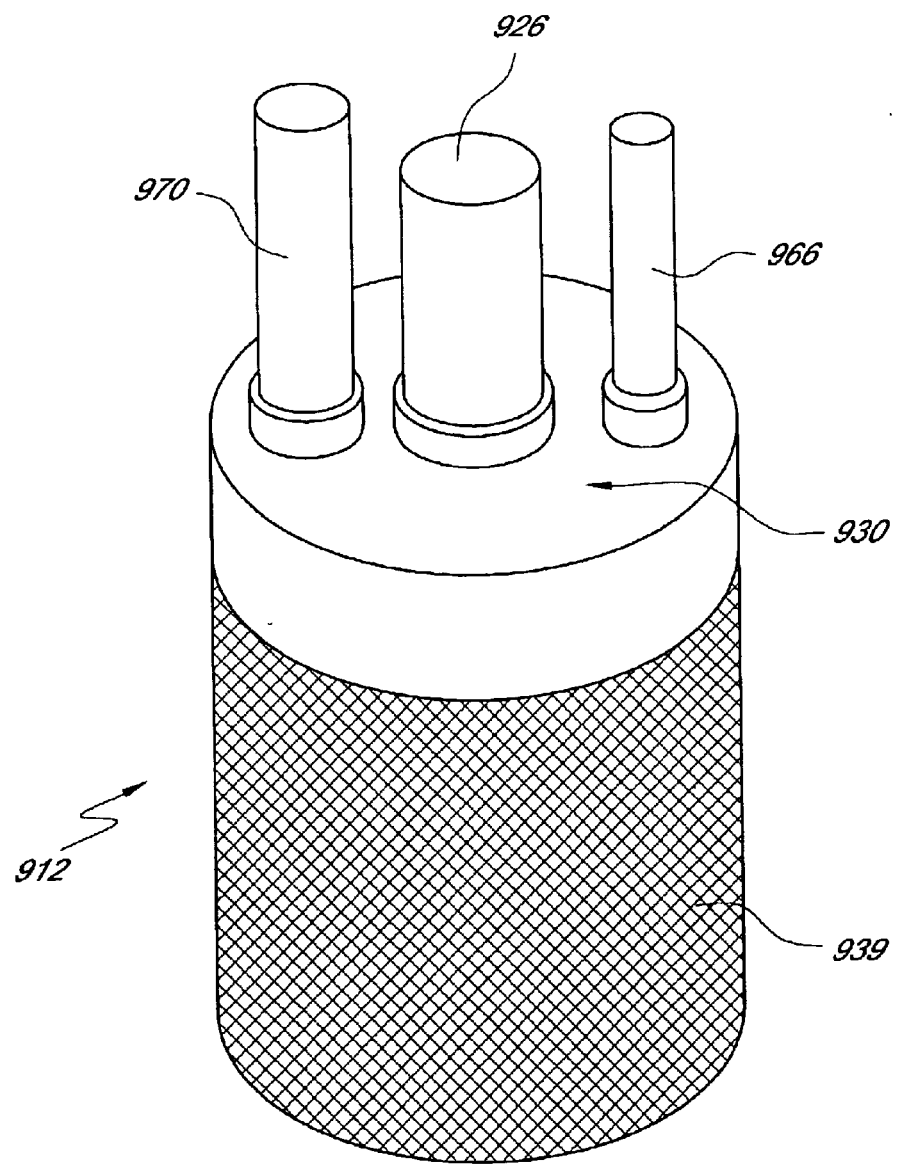
FIG. 9 is a perspective view of a filter assembly of one embodiment of the system of FIG. 5.

FIG. 9, is a perspective view of a filter assembly 912 of one embodiment of the invention. This filter assembly 912 utilizes a pump discharge line 926, which in embodiments not using a submersible pump (not shown) would be a suction line. As in other embodiments, the pump discharge line 926 extends through the top of the filter assembly 912 and into the middle of the filter assembly 912 itself. The filter assembly 912 also uses a flushing supply line 966 to supply flushing fluid to the filter assembly 912 for back flushing the filter assembly 912. Finally, the embodiment illustrated in FIG. 9 incorporates an expansion line 970 that extends from the middle of the filter assembly 912 up through the top 930 and up to the surface of the fluid being pumped thereby exposing the filter assembly 912 to atmospheric pressure. For instance, if the filter assembly 912 were used at a depth of 800 feet beneath the surface of the ocean, the inside of the filter assembly 912 would be at or about atmospheric pressure, while the outside of the filter assembly 912 would experience a pressure of about 357 psi above atmospheric. As fluid began to flow through the filter element 939, it would eventually fill up the inside of the filter assembly 912 and begin to rise up the expansion line 970 thereby raising the pressure in the inside of the filter assembly 912 and decreasing the differential pressure between the outside and inside of the filter assembly 912. However, in embodiments using a submersible pump (not shown), the water building up in the expansion line 970 provides net positive suction head to the suction of the pump, which can aid in the pumping efficiency of many pumps. As the pump begins to pump the filtered fluid up the discharge line 926 to the surface, the level of fluid in the expansion will drop until there is a balance between the flow rate of the pump and the rate of filtration through the filter assembly 912, at which time the level in the expansion line 970 will stabilize at a steady state level. In some embodiments, the pump efficiency will be unrelated to the suction head provided by the expansion line 970 and the level in the expansion line will always change unless the pumping rate is equivalent to the filtration rate.

The invention overcomes the longstanding problem of providing a self-cleaning filter assembly that can be used with existing submersible pumps or other pumps during pumping operations. A submersible pump or a suction line can be inserted into the filter basket and then placed into a fluid source such that particulate material is screened from the fluid by a filter element. The screened particulate material can then be dislodged or expelled from the surface of the filter element during pumping operations without having to secure pumping or remove the filter element from the fluid source.

The foregoing description details certain embodiments of the invention and describes the best mode contemplated. Specific parts, shapes, materials, functions and modules have been set forth. However, a skilled technologist will realize that there are many ways to fabricate the system of one embodiment of the invention, and that there are many parts, components, modules or functions that may be substituted for those listed above. While the above detailed description has shown, described, and pointed out fundamental novel features of the invention as applied to various embodiments, it will be understood that various omissions and substitutions and changes in the form and details of the components illustrated may be made by those skilled in the art, without departing from the spirit or essential characteristics of the invention. The scope of the invention should therefore be construed in accordance with the appended claims and any equivalents thereof.

What is claimed is:

1. A filter apparatus for use with a pump, said filter apparatus comprising:
   a filter element;
   a supply line for delivery of a flushing medium;
   a filter basket, wherein said filter element encloses at least a portion of said filter basket, and wherein said filter basket comprises:
      a manifold, comprising:
         a flushing medium supply opening in a first surface thereof for receiving said supply line;
         a plurality of apertures in a second surface of said manifold;
         an internal chamber fluidly connecting said flushing medium supply opening with said plurality of apertures;
         a blocking piece positioned in said internal chamber configured to rotatably move in said internal chamber and periodically block a flow of flushing fluid from the flushing medium supply opening to less than all of the plurality of apertures; and
      a plurality of tubes, wherein each tube of said plurality of tubes extends from one of said plurality of apertures and includes a plurality of perforations such that a flushing medium may flow from said supply line through the internal chamber into the plurality of tubes and through said perforations to backflush said filter element.

2. The filter apparatus of claim 1, further comprising a submersible pump with an electrical motor within the filter basket.

3. The filter apparatus of claim 2, wherein the manifold further comprises a first hole therein, wherein a pump discharge line passes through said first hole and connects to said pump.

4. The filter apparatus of claim 3, wherein the flushing medium is a fluid from the pump discharge line.

5. The system of claim 4, wherein the flushing fluid comprises filtrate.

6. The system of claim 4, wherein the flushing fluid comprises at least one part chosen from the group consisting of chlorine dioxide, air, chlorine, nitrogen, helium, argon, and carbon dioxide, anolyte and carbon monoxide.

7. The system of claim 4, wherein the flushing fluid comprises a gas.

8. The self-cleaning filter apparatus of claim 7, wherein the column of fluid acts with the suction line to cause a flow of filtrate through the filter element.

9. The self-cleaning filter apparatus of claim 3, further comprising an expansion line adapted to vent an inside of the filter apparatus to atmosphere.

10. The system of claim 3, wherein the filter basket is configured to be periodically backflushed by pressurizing the filtrate transport line with flushing fluid.

11. The system of claim 3, wherein the filter apparatus configured to be periodically back flush the filter by stopping the transport of filtrate out of the filtrate transport line and thereby allowing a volume fluid in the filtrate transport line to combine with an osmotic pressure across the semipermeable membrane to cause flow of filtrate from the inside of the filter apparatus to the outside.

12. The filter apparatus of claim 2, wherein the manifold further comprises a second hole therein, wherein an electrical supply line passes through said second hole and is electrically connected to said motor.

13. The self-cleaning filter apparatus of claim 12, wherein the pressurized volume of fluid is a pressure vessel.

14. The self-cleaning filter apparatus of claim 12, wherein the pressurized volume of fluid is an oil reserve.

15. The self-cleaning filter apparatus of claim 12, wherein the pressurized volume of fluid is a geothermal well.

16. The self-cleaning filter apparatus of claim 12, wherein the pressurized volume of fluid is a natural gas reserve.

17. The self-cleaning filter apparatus of claim 2, wherein the column of fluid acts with the suction line to cause a flow of filtrate through the filter element.

18. The system of claim 2, wherein the filtrate is transported out through the filtrate transport line using a submersible pump.

19. The system of claim 2, wherein the filtrate is at least partially drained from the inside of the filter apparatus by gravity.

20. The self-cleaning filter apparatus of claim 1, wherein a column of fluid in contact with the outside surface of the filter element operably contributes to a differential pressure across the filter element.

21. The self-cleaning filter apparatus of claim 1, wherein the filter apparatus is submerged in fluid to be filtered to a depth that will produce a desired differential pressure across the filter element.

22. The self-cleaning filter apparatus of claim 1, wherein the filter apparatus is placed in a pressurized volume of fluid.

23. The filter apparatus of claim 1, wherein the filter basket is substantially cylindrical.

24. The filter apparatus of claim 1, wherein the filter element is a filter sock.

25. The filter apparatus of claim 1, wherein each tube comprises two rows of perforations along the length of the tube, said rows positioned about 180 degrees apart.

26. The filter apparatus of claim 1, wherein the filter basket comprises six tubes.

27. The filter apparatus of claim 1, further including a bottom plate removably attached to a lower end of the plurality of tubes.

28. The filter apparatus of claim 1, further including a bottom plate with an opening therein through which a submersible pump can be inserted.

29. The filter apparatus of claim 1, further comprising a fluid to be filtered by said filter apparatus.

30. The filter apparatus of claim 29, wherein said fluid to be filtered comprises oil in an automobile lubrication oil system.

31. The filter apparatus of claim 29, wherein said fluid to be filtered comprises fluid in an automobile transmission system.

32. The filter apparatus of claim 29, wherein said fluid to be filtered comprises oil in an equipment lubrication oil system.

33. The filter apparatus of claim 29, wherein said fluid to be filtered comprises oil from a pressurized oil well.

34. The filter apparatus of claim 29, wherein said fluid to be filtered comprises water from a pressurized aquifer.

35. The system of claim 1, wherein the filter element comprises a semipermeable membrane and wherein the depth is calculated to coordinate with a surface area of the membrane to cause a predetermined flow rate of filtrate into the inside of the filter basket.

36. A filter apparatus for use with a submersible pump, said filter apparatus comprising:
   a filter element;
   a filter basket, wherein said filter element extends about at least a portion of said filter basket, and wherein said filter basket comprises:
      a manifold comprising:
         a plate with a slot chamber formed therein fluidly connecting a flushing medium supply opening with a plurality of apertures;
         a blocking piece positioned within the slot chamber configured to periodically block less than all of a flow of fluid from the flushing medium supply opening and the plurality of apertures; and
      a plurality of tubes, wherein each tube of said plurality of tubes extends from one of said plurality of apertures so as to form a substantially cylindrical filter basket, and wherein said tubes have a plurality of perforations for directing a flushing medium to impinge upon an interior surface of the filter element to dislodge or expel particulate material entrapped on the filter element.

37. The filter apparatus of claim 36, further including a submersible pump and an electrical motor within the filter basket.

38. The filter apparatus of claim 36, wherein each tube comprises two rows of perforation along the length of the tube, said rows positioned about 180 degrees apart.

39. The filter apparatus of claim 36, wherein the manifold further comprises a first hole therein, wherein a pump discharge line passes through said first hole and connects to said pump.

40. The filter apparatus of claim 36, wherein the filter element is a synthetic filter sock.

41. The filter apparatus of claim 36, wherein the tubes are heat fused to the manifold.

42. The filter apparatus of claim 36, wherein the tubes are welded to the manifold.

43. The filter apparatus of claim 36, wherein the tubes are, glued to the manifold.

44. The filter apparatus of claim 36, wherein the filter basket comprises six tubes.

45. The filter apparatus of claim 36, further including a bottom plate removably attached to a lower end of the plurality of tubes.

46. The filter apparatus of claim 36, further including a bottom plate with an opening therein through which a submersible pump can be inserted.

47. A system for cleaning a filter apparatus used for screening the intake of a pump, said system comprising:
   a supply tank for storing a flushing medium;
   a supply line for delivery of the flushing medium;
   a filter apparatus comprising:
      a filter element;
      a filter basket, wherein said filter element extends about at least a portion of said filter basket, and wherein said filter basket comprises:
         a manifold, comprising:
            a flushing medium supply opening in a first surface thereof for receiving said supply line;
            a plate with a slot chamber formed therein and adapted to fluidly connect the flushing medium supply opening to a plurality of apertures;
            a blocking piece positioned within the slot chamber and configured to periodically block a flow of fluid from the flushing medium supply opening to less than all of the plurality of apertures; and
         a plurality of tubes, wherein each of said plurality of tubes extends from one of said plurality of apertures and comprises a plurality of perforations adapted to direct the flushing medium to impinge upon an interior surface of the filter element.

48. The system of claim 47, further including a submersible pump with an electric motor within the filter basket.

49. The system of claim 47, wherein the filter basket is substantially cylindrical.

50. The system of claim 47, wherein the flushing medium is air.

51. The system of claim 47, wherein the flushing medium comprises at least one part chosen from the group consisting of chlorine dioxide, air, chlorine, nitrogen, helium, argon, carbon dioxide, anolyte and carbon monoxide.

52. The system of claim 47, wherein the filter element is a filter sock.

53. The system of claim 47, wherein each tube comprises two rows of perforations extending along the length of the tube, said rows positioned about 180 degrees apart.

54. The system of claim 47, further including a bottom plate removably attached to a lower end of the plurality of tubes.

55. The filter apparatus of claim 47, further including a bottom plate with an opening therein through which a submersible pump can be inserted.

56. A method of flushing a filter apparatus used to screen the intake of a pump, the method comprising:

encasing a pump having a pump suction inlet in a filter basket comprising a plurality of tubes, wherein each tube has at least one perforation therein;

surrounding at least a portion of the filter basket with a filter element such that a fluid to be pumped passes through the filter element to reach the pump suction inlet;

directing a flushing medium to a chamber in fluid connection with the perforations in the tubes such that the flushing medium is sprayed in an outwardly direction against interior surfaces of the filter element to dislodge or expel entrapped particulate material during operation of the pump; and blocking the flow of the flushing medium to at least one of the tubes with a blocking piece configured to rotate around the chamber such that blocking piece sequentially blocks the flow of the flushing fluid to at least one of the tubes by passing over an aperture connecting the chamber with the tube.

57. The method of claim 56, wherein the flushing medium is supplied from the discharge line of the pump.

58. The method of claim 56, wherein the flushing medium is water.

59. The method of claim 56, wherein the flushing medium comprises at least one part chosen from the group consisting of chlorine dioxide, air, chlorine, nitrogen, helium, argon, carbon dioxide, anolyte and carbon monoxide.

60. The method of claim 56, wherein the blocking piece is configured to allow flow substantially to two adjacent ones of the tubes at a time.

61. The method of claim 56, wherein the act of directing the flushing medium further comprises, directing the flushing medium out of two rows of perforations longitudinally spaced along each tube.

62. A filter apparatus for filtering a fluid intake of a pump during pump operation, the apparatus comprising:

means for encasing a pump suction inlet in a filter basket;

means for filtering a fluid to be pumped before it enters the pump suction inlet;

means for directing a flow of a flushing medium from the means for encasing the pump suction inlet such that the flushing fluid is sprayed in an outwardly direction against filtering means to dislodge or expel entrapped particulate material and means for periodically blocking less than all of the flow of the flushing medium.

63. The filter apparatus of claim 62, wherein the flushing medium is air.

64. The filter apparatus of claim 62, wherein the flushing medium is water.

65. A self-cleaning filter apparatus comprising:

at least one filter element having an inside surface and an outside surface;

at least one suction line;

a manifold adapted to sequentially supply flushing fluid to a plurality of apertures; and a plurality of tubes, wherein each tube of said plurality of tubes extends from one of said plurality of apertures and includes a plurality of perforations such that the flushing fluid can flow into the plurality of tubes and through said perforations;

wherein said filter element encloses at least a portion of said plurality of tubes, and wherein the perforations are adapted to direct the flushing fluid generally out toward the inner surface of the filter element.

66. The self-cleaning filter apparatus of claim 65, wherein a column of fluid in contact with the outside surface of the filter element operably contributes to a differential pressure across the filter element.

67. The self-cleaning filter apparatus of claim 66, further comprising an expansion line adapted to vent an inside of the filter apparatus to atmosphere.

68. The self-cleaning filter apparatus of claim 67, wherein the pressurized volume of fluid is a pressure vessel.

69. The self-cleaning filter apparatus of claim 67, wherein the pressurized volume of fluid is an oil reserve.

70. The self-cleaning filter apparatus of claim 67, wherein the pressurized volume of fluid is a geothermal well.

71. The self-cleaning filter apparatus of claim 67, wherein the pressurized volume of fluid is a reserve gas reserve.

72. The self-cleaning filter apparatus of claim 65, wherein the filter apparatus is submerged in fluid to be filtered to a depth that will produce a desired differential pressure across the filter element.

73. The self-cleaning filter apparatus of claim 65, wherein the filter apparatus is placed in a pressurized volume of fluid.

* * * * *